(No Model.)
L. N. BLESSING.
FILTER.
No. 471,840. Patented Mar. 29, 1892.
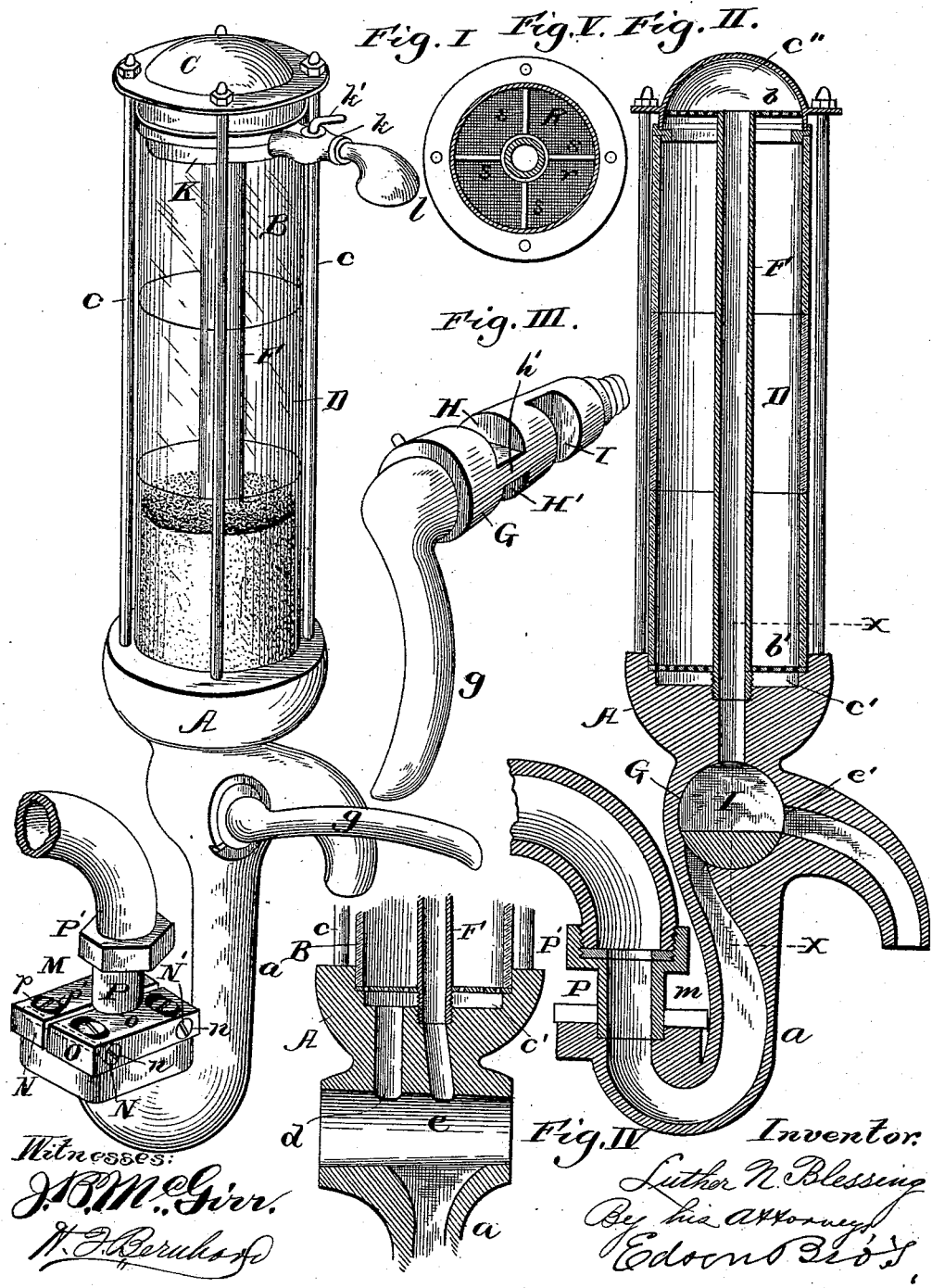
Witnesses:
J. B. McGirr.
W. J. Bernhof.
Inventor:
Luther N. Blessing
By his Attorneys
Edson Bros.

UNITED STATES PATENT OFFICE.

LUTHER N. BLESSING, OF BALTIMORE, MARYLAND.

FILTER.

SPECIFICATION forming part of Letters Patent No. 471,840, dated March 29, 1892.

Application filed April 28, 1891. Serial No. 390,769. (No model.)

*To all whom it may concern:*

Be it known that I, LUTHER N. BLESSING, a citizen of the United States, residing at Baltimore, in the State of Maryland, have invented certain new and useful Improvements in Filters; and I do hereby declare the following to be a full, clear, and exact description of the invention, such as will enable others skilled in the art to which it appertains to make and use the same.

My invention relates to improvements in filters; and the objects are, first, to provide a simple, cheap, and effective filter adapted to be attached to a faucet or other source of liquid supply, and, secondly, to provide a filter in which the filtering medium can be easily cleansed or renewed without detaching the filter from the faucet or other source of supply.

With these ends in view my invention consists in the combination, with a vessel containing a central conduit or tube and adapted to receive a filtering medium, which is placed around said conduit or tube, of a novel cut-off or valve seated in the base of the filter and constructed to admit water into the conduit or tube to cause it to pass upwardly through the tube and then pass downwardly through the filtering medium to filter the water, to admit the water to the filtering medium to cause it to pass up through the same and then downward through the central tube to cleanse the filtering medium of accumulated sediment, the water in both instances being discharged through the outlet-nozzle in the base or support.

My invention further consists in a novel surface blow-off for the escape of slime and sediment that accumulates on the surface of the filtering medium and which cannot be readily removed from the filtering medium by reversing the water-current.

The invention further consists in the novel construction and combination of parts, which will be hereinafter fully described, and particularly pointed out in the claims.

To enable others to more readily understand my invention, I have illustrated the same in the accompanying drawings, in which—

Figure I is a perspective view of a filter constructed in accordance with my invention. Fig. II is a vertical sectional view through the same. Fig. III is a detail perspective view of the key or plug. Fig. IV is a section through the base and plug or key on the line $x\,x$ of Fig. II.

Like letters of reference denote corresponding parts in the several figures of the drawings, referring to which—

A designates the base of my improved filter, which is provided with a siphon $a$, adapted to be attached to a faucet at its open free end.

Seated in a suitable seat formed in the upper side or surface of the base or support A is a vessel or receptacle B, which may, as shown in the drawings, be composed of two or more annular sections resting one on the other or be made of only one section, as desired. The upper end of the vessel B is closed by a cap or cover C, which is united to or connected with the base-piece A by a series of vertical rods or bolts $c$, arranged exteriorly of the receptacle B.

Within the receptacle B, and near the upper and lower ends thereof, respectively, are arranged perforated diaphragms $b\,b'$, which form a small chamber $c'$ at the lower end of the vessel, another small chamber $c''$ at the upper end thereof, and the intermediate filtering-chamber D between the two diaphragms.

The base A is provided near its upper end with a transverse chamber $e$, which communicates with a discharge-nozzle E through a port or opening $e'$, and said chamber is connected with the chamber $c'$ by an opening or slot $d$ and with the chamber $c''$ through a pipe or conduit F, which extends through the diaphragm $b'$, and after passing through the chamber D opens into the chamber $c''$ a short distance above the diaphragm $b$.

Fitted within the transverse chamber $e$ in the base or support A is a cut-off or plug G, which is provided at one end with a handle $g$ and which is kept from endwise movement in the chamber $e$ by a nut screwed on the other end thereof. The plug G is provided with three passages or ways, two of which H H' extend parallel to each other and are separated only by a wall or partition $h'$, while the third passage I extends through the plug G at one side of and at right angles to the length of the passages H H' therein.

Between the lower edges of the cap C and the edges of the vessel B is fitted a ring K, which carries a short nozzle $k$, provided with a key or plug $k'$. The inner end of this discharge-tube or nozzle enters the chamber D near the upper end thereof, and on the outer end of the nozzle is swiveled a funnel $l$, such device forming a surface blow-off as well as for admitting the filtering medium to the receptacle. The chamber D is wholly or partially filled with any suitable filtering medium, as sand, charcoal, brick-dust, or other substance.

The filter is attached to the faucet by means of a coupling M, applied to the free end of the curved tubular portion $a$ of the base.

The conduit has an enlarged seat $m$ at its free end. On this seat rests the coupling, consisting of two parallel plates N O, arranged side by side with relation to each other and adjustably attached to the seat and to each other, as will appear presently. The plates are recessed at $o$ on their inner faces to adapt the faucet or spigot to be fitted between the same, and transversely to the plates are formed threaded openings or passages $n$, through which pass the adjustable screws N', by means of which the plates can be contracted to firmly clamp them to the faucet or nozzle. Vertical slots $p$ are formed in the adjustable plates, and through these slots pass screws $p'$, which enter threaded openings in the seat M, so that the plates can be fixed to the siphon, and at the same time they can be adjusted on the seat by the screws N' to clamp them firmly to the faucet. If the filter is to be attached to a threaded faucet, a threaded socket is formed in the opposing faces of the plates to receive the threads on the faucet; but if the filter is to be applied to a smooth or goose-neck faucet, I employ a tubular connection P, which is fitted between the clamping-plates, and has a packed mouth P', into which the smooth faucet is tightly fitted.

The operation of my invention is as follows: The filter is attached to a faucet or other source of supply and water or other liquid admitted therefrom to the connection $a$. By turning the handle $g$ the plug G is adjusted to cause the passage I to align with the opening in the connection $a$ and with the pipe or conduit F, and the liquid is permitted to pass up through such conduit and be discharged in the chamber $c''$, from whence the water passes down through the diaphragm $b$, the filtering medium in the chamber D, and the diaphragm $b'$, through the outlet $d$ and the passage H' in the plug, which aligns with said opening $d$ and the inner end of the discharge-nozzle E. To clean the filtering medium, the handle $g$ is turned to bring the passage H into line with the port leading to the chamber D, and the water then passes through the connection $a$, the passage H, and the port $d$ into the chamber $c'$, the upward passage of the water through the filtering medium serving to thoroughly agitate the same.

The water after passing through the filtering medium enters the chamber $c''$, and from thence passes down through the pipe or conduit F and out through the passage I in the plug G to the discharge-nozzle E. By turning the plug to open the discharge-tube $k$ the sediment on the surface of the filtering medium and the upper diaphragm, which may have been taken up by the filtering medium, is permitted to escape through said discharge-tube and the funnel. To renew the filtering material without detaching the filter from the faucet, the funnel $l$ can be turned into the proper upright position and the valve operated to open the tube $k$, whereby the material can be poured into said funnel and conveyed through the tube $k$ into the chamber D.

It will be observed from the foregoing description that I have provided a single valve or plug of simple construction, which enables me to control the passage of water through the filter to cleanse and purify the water, as well as to wash or cleanse the filtering medium of accumulated matter therein. It is only necessary to reverse the plug or valve to reverse the direction of flow of the water.

The surface blow-off provides means for readily removing sediment on the surface of the filtering medium and in the upper part of the receptacle, which cannot be taken out by reversing the flow of water through the chamber.

To prevent the perforated diaphragms $b$ $b'$ from being destroyed under pressure of the water or bulging out of its horizontal plane, I provide metallic fenders or guards R, each composed of a ring or annulus and adapted to fit around the central tube or conduit F, and a series of arms or limbs $s$, secured to or integral with said ring or annulus and having their other ends secured either to the cap or base of the filter. One of these fenders or guards is placed around the central conduit or tube F, and they may be on each side of each of the perforated diaphragms.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus described my invention, what I claim as new, and desire to secure by Letters Patent, is—

1. In a filter, the combination, with a hollow base provided with a suitable discharge nozzle or spout, of a vessel communicating with the interior of said support and having a pipe or conduit arranged centrally therein and opening at its lower end into the interior of the base, a plug arranged in the support for regulating the admission of liquid to the filter, and a valved discharge pipe or tube arranged near the upper end of the filter and having an outlet-mouth swiveled thereto, substantially as shown and described.

2. The filtering-chamber having the shell, the cap fitted thereto, and the diaphragm within said chamber, combined with an annulus or ring clamped between the shell and cap, the valved tube connected to said annulus or ring, and the swiveled mouth-piece fitted to the tube, substantially as described.

3. In a filter, the combination of a base having the transverse chamber and the discharge-spout, the vessel or receptacle, the tube within said receptacle, and a single plug or key seated in the chamber of the base and provided with the ways divided by an intermediate partition and with the slot extending at right angles to said ways, substantially as described.

4. In a filter, the combination, with a base having a seat formed on the outer end of its spout, of the coupling-plates fitted on said seat and adjustably connected together, and a supply-pipe having one end thereof fitted between the coupling-plates, substantially as shown and described.

5. In a filter, the combination, with a base having a seat formed on the outer end of its spout, of the coupling-plates provided with recesses in their adjacent edges, the vertical screws passing through slots in said plates and entering the seat, the transverse adjusting-screws which connect said plates together, and a supply-pipe having its free end fitted in the recesses in the coupling-plates, substantially as shown and described.

In testimony whereof I affix my signature in presence of two witnesses.

LUTHER N. BLESSING.

Witnesses:
SOLOMON N. HESS,
JOHN L. COLLINS.